United States Patent [19]

Falla

[11] Patent Number: 5,043,088

[45] Date of Patent: Aug. 27, 1991

[54] DEICING COMPOSITION CONTAINING ONE OR MORE FLUORINATED SURFACTANTS

[75] Inventor: Daniel J. Falla, Sarnia, Canada

[73] Assignee: The Dow Chemical Company, Midland, Mich.

[21] Appl. No.: 468,452

[22] Filed: Jan. 22, 1990

[51] Int. Cl.$^5$ ................................................ C09K 3/18
[52] U.S. Cl. ......................................... 252/70; 106/13
[58] Field of Search ............................ 106/13; 252/70

[56] References Cited

U.S. PATENT DOCUMENTS

| 2,373,727 | 4/1945 | West et al. |
| 2,469,309 | 5/1949 | Morris et al. |
| 3,096,290 | 7/1963 | Duane et al. |
| 3,245,912 | 4/1966 | White ................................. 252/70 |
| 3,362,909 | 1/1968 | Georgal et al. |
| 3,696,042 | 10/1972 | Wright |
| 3,705,854 | 12/1972 | Gunning |
| 4,135,637 | 11/1980 | Singleton |
| 4,254,166 | 3/1981 | Glanville et al. |
| 4,283,297 | 8/1981 | Peters et al. |
| 4,585,571 | 4/1986 | Bloom |

FOREIGN PATENT DOCUMENTS 3208219 3/1982 Fed. Rep. of Germany .

OTHER PUBLICATIONS

DuPont Chemicals, "DuPont Performance Products" (Zonyl Fluorosurfactants).

Primary Examiner—Paul Liberman
Assistant Examiner—William S. Parks

[57] ABSTRACT

A deicing composition for use in removing ice from a surface such as the windshield of an automobile, which consists essentially of one or more monohydric alcohols, one or more polyhydric alcohols, and one or more anionic fluorinated surfactants in combination.

17 Claims, No Drawings

DEICING COMPOSITION CONTAINING ONE OR MORE FLUORINATED SURFACTANTS

BACKGROUND OF THE INVENTION

1. Field of the Invention

The present invention relates to fluids for melting and/or preventing the formation or re-formation of ice on a surface, and more particularly, to deicing compositions for removing ice from the windshield of an automobile.

2. Brief Description of the Prior Art

The difficulties occasioned by the formation of ice on a surface are well known. The term "ice" as used herein refers generically to the various forms of frozen water which may be encountered on surfaces such as sidewalks, aircraft, automobile windshields, car doors and locks, roads and the like In the specific context of a deicing composition for use on automobile windshields, for example, the characteristics that are desired in the deicing composition are also well known. Among the more important of these characteristics are the ability to melt ice quickly, to inhibit its re-formation after a period of time, and to have a sufficiently low viscosity to "wet" the windshield fully without smearing or streaking, and the compatibility of the composition with the materials comprising the automobile's windshield and its immediate surroundings.

A number of deicing formulations have been developed over the years, and the art reflects a continuing effort to find a formulation which fully possesses each of the recited characteristics. Several deicing compositions have been developed containing monohydric alcohols to initially melt the ice on a windshield, polyhydric alcohols to inhibit the reformation of ice, and surfactants.

For example, one commercially available deicing product utilizes a composition including monohydric and polyhydric alcohols, a dye, about 1.5 percent by weight of water, and an alkyloxyalkyl sodium sulfate surfactant.

U.S. Pat. No. 3,245,912 to White discloses a deicing composition including monohydric alcohols, polyhydric alcohols, and from 0.25 to about 3 percent by weight of an alkylphenoxypolyethanoxyethanol surfactant. The monohydric alcohols fraction is preferably mostly isopropanol, and the reference discusses the previous commercial use of combinations of monohydric and polyhydric alcohols in deicing.

U.S. Pat. No. 4,235,637 to Singleton discloses an anti-foggant composition, as opposed to a deicing composition, which incorporates a lower alcohol, a lower polyhydric alcohol, and a surfactant or a mixture of anionic or nonionic surfactants such as contained in an IVORY liquid dishwashing detergent, for example, with starch granules for spraying onto mirrors and the like. The lower alcohol can be isopropyl alcohol, propyl alcohol, ethyl alcohol, or methyl alcohol, for example.

Japanese Application 63-077,987 discloses a foam composition for use in preventing the freezing over of windshields, for example. The composition contains lower alcohols such as methanol and isopropanol, hygroscopic polyhydric alcohols such as ethylene glycol and glycerol, and polyoxyethylene stearyl and cetyl ethers as surfactants for forming and maintaining the foam.

A liquid deicing formulation containing 30 percent of ethylene glycol, 70 percent of isopropanol, and 1–10 percent of nonionic surfactants based on the combined ethylene glycol and isopropanol is reported by Ushakova, Tr. Nauch.-Issled. Tekhnokhim. Inst. Byt. Obsluzhivaniya, No.6, 34–39(1965).

Japanese Application 71-16487 discloses a frost-preventing agent for car windshields and windows which comprises as a major component one or more glycols, an alcohol diluent, 2-ethoxyethanol and a surfactant for use as a wetting agent.

West German patent DE 3,208,219 A1 to Wack et al. discloses an anti-icing liquid for the windshield of an automobile which contains an "active substance" such as a citrate, phosphate, nitrilotriacetic acid or ethylenediaminetetraacetic acid in a concentration between 3 percent and the saturation concentration of the active substance in water, 0.01 to 5 percent of a (fluoro)surfactant for improved wetting of the windshield, 2–12 percent alcohol for improved wetting also, 5–30 percent of glycol(s), and 1–8 percent of a "solvent aid", with the remainder being water. Examples of suitable "solvent aids" include "toluene sulfonate, xylene sulfonate, cumene sulfonate or a derivative of an alkyl-substituted dicarboxylic acid such as an alkyl radical from $C_1$ to $C_{12}$ reacted with maleic anhydride."

The seemingly complete body of art relating to deicing compositions does not, however, appear to disclose or suggest the comparatively simple yet efficacious composition described below.

SUMMARY OF THE INVENTION

It has been discovered that a simple composition consisting essentially of one or more monohydric alcohols, one or more polyhydric alcohols, and one or more fluorinated surfactants possesses the characteristics desired of a deicing fluid for automobile windshields and windows particularly.

More specifically, it has been discovered that a composition consisting essentially of from about 70 percent by weight of the one or more monohydric alcohols, from about 5 percent by weight of the one or more polyhydric alcohols, and from about 0.001 percent up to about 5 percent by weight of the one or more fluorinated surfactants melts ice from a windshield, inhibits its effective re-formation, and is compatible with older and newer car finishes as well as vinyl tops, windshield seals and wiper blades.

DETAILED DESCRIPTION OF THE PREFERRED EMBODIMENT

The monohydric alcohol or alcohols which comprise a portion of the composition of the present invention are water-soluble and are primarily included to melt existing ice from a surface such as an automobile windshield quickly. Preferred monohydric alcohols possess from one to three carbon atoms and include methanol, ethanol, n-propanol, and isopropanol. The monohydric alcohol portion or fraction preferably comprises from about 70 to about 95 percent by weight of the deicing composition. Most preferably, the monohydric alcohol portion of the composition is at least about 70 percent by weight of isopropanol, and comprises from about 70 to about 90 percent by weight of the composition.

The polyhydric alcohol or alcohols which are used in the present invention provide a resistance to re-freezing and to the effective re-formation of ice on the windshield or other surface after the ice has been once melted. Preferred polyhydric alcohols are the alkylene and dialkylene glycols containing from two to four carbon atoms in the alkyl portion or portions, respectively, thereof- for example, ethylene glycol, diethylene glycol, propylene glycol, and dipropylene glycol. The polyhydric alcohol portion preferably comprises from about 5 to about 30 percent by weight of the composition. Most preferably, the polyhydric alcohol portion is at least about 10 percent by weight of propylene glycol, and comprises from about 10 to about 30 percent by weight of the composition.

The one or more fluorinated surfactants which are necessary to the present invention are preferably included in amounts which are effective for the primary purpose of increasing the speed at which the monohydric alcohol or alcohols melt existing ice from a surface, while at the same time being compatible with automobile finishes, vinyl coverings, windshield seals, windshield wipers and other materials likely to be contacted by the windshield deicer composition.

Fluorinated surfactants which have specifically been found suitable for use in the deicing composition of the present invention are presently sold as Zonyl* FSJ fluorosurfactant by E. I. DuPont de Nemours & Co., Inc., Wilmington, Del. The Zonyl* FSJ fluorosurfactant material is said by the manufacturer to comprise about 15 percent by weight of isopropanol, about 40 to 45 percent by weight of water, and about 40 percent by weight of a mixture of fluorinated surfactants and non-fluorinated surfactants, of which mixture the non-fluorinated surfactants comprise about 15 percent by weight. The fluorinated surfactants are a mixture of mono- and bis- fluoroalkyl phosphates, ammonium salt, complexed with an aliphatic quaternary methosulfate.

Other fluorinated surfactants which may be suitably used include the fluorosurfactant materials presently commercially available under the Zonyl* FSK, Zonyl* FSN, Zonyl* FSO, and Zonyl* FSP product designations from E. I. DuPont de Nemours & Co., Inc., Wilmington, Del. The Zonyl* FSK material is described by its manufacturer as comprising about 53% by weight of acetic acid and about 47% by weight of a perfluoroalkyl N-type betaine. The Zonyl* FSN fluorosurfactant material is described as comprising about 40% of a perfluoroalkyl ethoxylate, about 30% by weight of isopropanol, and about 30% by weight of water. The Zonyl* FSO material is said to comprise about 50% by weight of a perfluoroalkyl ethoxylate mixture, about 25% by weight of ethylene glycol, and about 25% by weight of water, while the Zonyl* FSP material is described as comprising about 35% by weight of a mixture of mono- and bis- perfluoroalkylphosphates, about 20% by weight of isopropanol, and about 45% by weight of water.

The fluorinated surfactants contributed by these Zonyl* fluorosurfactant materials preferably comprise from about 0.001 to about 1.0 percent by weight of the deicing composition, although it is anticipated that generally up to about 5 percent by weight could be used of the fluorosurfactants without detrimental effect on the performance of the windshield deicer provided by the present invention, with the amount of isopropanol or other monohydric alcohol(s) being reduced proportionately. Most preferably, the fluorinated surfactants are employed in the form of an amount of the Zonyl* FSJ fluorosurfactant material that is from about 0.01 to about 0.5 percent by weight of the deicer, which would correspond according to the manufacturer's specifications to a fluorinated surfactant content of from about 0.003 to about 0.17 percent by weight of the deicer. While additional Zonyl* FSJ fluorosurfactant material may be added above the range of amounts thus specified for the most preferred embodiment, no particular advantage has been seen from doing so, and embodiments employing amounts in the neighborhood of about 0.05 percent by weight of the Zonyl* FSJ material have been found to be fully effective.

While the Zonyl* FSJ material contributes some water and some non-fluorinated surfactants to the deicer composition in its preferred form, the amounts of water and non-fluorinated surfactants contributed thereby each comprise less than about 0.5 percent by weight of the overall composition. It should be noted that while additional water and other materials could conceivably be added to the deicer of the present invention without substantially diminishing its effectiveness, it will be seen that the present deicer is possessed in the simple formulations set forth above of the desired characteristics for such a deicer without incurring the expense associated with adding such additional materials. In particular, the deicer constituted as described herein melts ice from a windshield, inhibits its effective re-formation, and is compatible with older and newer car finishes as well as vinyl tops, windshield seals, and wiper blades.

The deicer may optionally contain from about 0.0001 to about 0.1 percent by weight of a dye for purposes of identification, and preferably this dye is a nonionic polymeric, non-azo dye which will not stain clothing, skin, or the interior of an automobile on which the deicer is used. Most preferably the dye is a polymer bound triphenyl methane colourant, an example of which is presently sold under the designation Liquitint Patent Blue* by Milliken Chemical.

The deicer of the present invention is further illustrated by the following Examples.

EXAMPLE 1

Two deicer formulations were prepared and tested for compatibility with windshield wipers, vinyl exterior coverings, butyl rubber for sealing windshields, and various painted surfaces and finishes prepared on test panels and on autos from a scrap yard. Formulation A was comprised of 79.98 wt. percent isopropanol, 20.00 wt. percent propylene glycol, 0.02 wt. percent Zonyl* FSJ fluorosurfactant, and 0.004 wt. percent of the Liqui-Tint Patent Blue* dye Formulation B was comprised of 79.98 wt. percent isopropanol, 15.00 wt. percent propylene glycol, 5.00 wt percent ethylene glycol, 0.02 wt. percent Zonyl* FSJ fluorosurfactant, an percent Liqui-Tint Patent Blue* dye.

a. Windshield Wiper Compatibility

Windshield wiper samples were weighed and measured, then immersed in the deicer formulations for a period of 48 hours. After immersion, the samples were removed and remeasured and reweighed. The weight of the samples after immersion in formulations A and B increased less than 0.01 percent.

b. Vinyl Covering Compatibility

A sample of brown vinyl used for exterior car roofs was tested per ASTM 1882 for both formulations, and the formulations were also tested on the vinyl tops of automobiles from a scrap yard, one automobile from the 1978 model year having beige vinyl and one automobile from the 1981 model year with red vinyl. Neither formulation was seen to have an effect on the vinyl samples tested.

c. Butyl Rubber Compatibility

Samples of butyl rubber were weighed and the dimensions measured, then immersed in the two formulations for three weeks at room temperature (about 20° C.). The samples were then removed, reweighed and remeasured. The formulations both were clear upon removal of the samples, and no dimensional or weight changes were noted for samples soaked in either formulation.

d. Painted Surfaces Compatibility

Samples of formulations A and B were tested according to ASTM 1882 on test panels prepared using a PPG Industries high solids white enamel base coat/clear coat finish, an Inmont Canada,Inc. high solids white enamel base coat/clear coat finish, and a PPG Industries high solids white enamel basecoat finish. Formulations A and B were also tested on a number of randomly selected autos from a local scrapyard. No change was noted in the test panels. Results from the scrapyard testing are reported in Table 1. "Soft Wax Finish" as used in Table 1 will be understood to mean that the wax finish of the automobile was softened.

TABLE 1

|  | A | B |
| --- | --- | --- |
| 1975 Pontiac Phoenix (Grey Metallic) | No effect | No effect |
| 1978 Chev. Impala (Brown Metallic) | No effect | No effect |
| 1978 Ford Cougar (Beige Metallic) | Soft Wax Finish | Soft Wax Finish |
| 1982 Ford Marquis (Yellow) | Soft Wax Finish | Soft Wax Finish |
| 1983 Chev. Malibu Classic (Green Metallic) | No effect | No effect No effect |
| 1981 Chev. Camaro (Blue Metallic) | No effect |  |
| 1987 Chrysler Rampage (Grey Clear Coat) | No effect | No effect |

EXAMPLE 2

The deicing ability and ability to inhibit the effective reformation of ice on a surface were tested for deicer formulations containing propylene glycol, isopropanol, the Liqui-Tint Patent Blue* dye, and various amounts of the Zonyl* FSJ material. In each of the deicer formulations, the dye comprised 0.004 wt. percent of the composition and the propylene glycol 20.00 wt. percent, with 0 wt. percent (formulation C),0.01 wt. percent (formulation D), 0.05 wt. percent(E), and 1.0 wt. percent (F) of the Zonyl* FSJ material, and the remainder comprising isopropanol.

a. Deicing Ability

In this and subsequent tests performed for this Example, a testing chamber capable of maintaining temperatures between $-20°$ C. and 60° C. and a relative humidity between 50 and 100% was used. A heat exchanger unit was located inside of the test chamber with four 20 cm. $\times$ 30 cm. polished aluminum panels carried thereby. Each panel was held at a slope of $10\pm.02$ degrees. The test panels were maintained at $-5\pm0.5°$ C.

The test chamber also was capable of simulating freezing rain conditions by supplying water at a constant pressure through nozzles producing a mist of specified droplet size, distribution and intensity. For purposes of this Example, the rain was applied at a rate of $5\pm0.2$ g/dm$^2$/hour, with an average droplet size of 20 microns and with 50 percent of the droplets being between 15 and 35 microns in diameter.

For the test of the deicing ability of the various formulations, the relative humidity of the test chamber was set at 80%, and freezing rain was applied for 15 minutes. After the rain had been applied, the panels were allowed to equilibrate for 5 minutes, and using a handheld spray bottle 2.5 grams of a respective deicer formulation was applied to each panel. After one minute, a window "squeegee" was dragged across the surface of each panel twice with constant pressure.

Not all of the ice was removed from panels treated with formulation C, a smaller amount of ice was observed to remain for panels treated with formulation D, and all of the ice appeared to have been melted on panels treated with formulations E and F.

b. Time to Re-formation of Ice

For this test, the room temperature was maintained at from 0° to 1° C., and the relative humidity controlled at 95 percent. After freezing rain was applied for 15 minutes, the test panels were again allowed to equilibrate for 5 minutes, whereupon generous quantities of a formulation were sprayed onto each panel. After one minute, the squeegee was dragged across each panel three times. The time to re-formation of ice was noted for the panels treated with the various formulations.

Each formulation containing the Zonyl* FSJ material appeared to perform identically well with this test. After one minute, some light condensation was noted. After three minutes at rest, ice was observed for each such formulation to cover about 5 percent of the surface. After four minutes 15 percent of the ice had reformed, and after 5 minutes, 50 percent had reformed. Finally, after 6 minutes, 70 percent of the surface of the panels was again covered. In contrast, formulation C (with none of the Zonyl* FSJ material) showed light condensation after one minute at rest, heavy condensation with ice over 5 percent of the surface after 2 minutes, ice over 25 percent of the surface after 3 minutes, over 50 percent of the surface after 4 minutes, over 70 percent of the surface after 5 minutes, and over 80 percent of the surface after 6 minutes.

c. Apparent Strength of Re-formed Ice

The same procedure was followed as in test (b) above, except that after 5 minutes of allowing the ice to reform, the squeegee was dragged across the surface of each panel twice and the surface of each panel examined for residual ice.

Panels treated with formulation C exhibited ice over 30 percent of the surface which strongly adhered to the surface, while panels treated with the remaining formulations were left with 20 percent of their surfaces covered with ice.

It can be seen from the foregoing examples that the deicing composition of the present invention is possessed of the characteristics which are desired of such materials, and is well suited for use with automobile windshields and the like in particular. Further, while preferred embodiments of the present invention have been set forth herein, it will nevertheless be appreciated that numerous modifications can be made thereto which do not depart from the spirit and scope of the present invention as defined by the appended claims.

What is claimed is:

1. A deicing composition which consists essentially of:
   one or more polyhydric alcohols;
   one or more monohydric alcohols; from about 0.001 to about 5.0% by weight of
   one or more fluorinated surfactants, and not more than 0.5% by weight of water.

2. A deicing composition as defined in claim 1, further comprising a non-staining, nonionic, non-azo polymeric dye.

3. A deicing composition as defined in claim 1, wherein said one or more polyhydric alcohols comprise from about 5 to about 30 percent by weight of the composition.

4. A deicing composition as defined in claim 1, wherein said one or more polyhydric alcohols comprise from about 10 to about 30 percent by weight of the composition.

5. A deicing composition as defined in claim 3, wherein said one or more polyhydric alcohols are selected from the group consisting of the alkylene and dialkylene glycols having from 2 to 4 carbon atoms in the alkyl portion or portions, respectively, thereof.

6. A deicing composition as defined in claim 5, wherein said one or more polyhydric alcohols are selected from the group consisting of ethylene glycol, diethylene glycol, propylene glycol, and dipropylene glycol.

7. A deicing composition as defined in claim 6, wherein said one or more polyhydric alcohols comprises at least about 10 percent by weight of propylene glycol.

8. A deicing composition as defined in claim 1, wherein said one or more monohydric alcohols comprise from about 70 to about 95 percent by weight of the composition.

9. A deicing composition as defined in claim 8, wherein said one or more monohydric alcohols comprise from about 70 to about 90 percent by weight of the composition.

10. A deicing composition as defined in claim 8, wherein said one or more monohydric alcohols are selected from the group consisting of the monohydric alcohols having from 1 to 3 carbon atoms.

11. A deicing composition as defined in claim 10, wherein said one or more monohydric alcohols comprises at least about 70 percent by weight of isopropanol.

12. A deicing composition as defined in claim 1, wherein said one or more fluorinated surfactants comprise from about 0.001 to about 5 percent by weight of the composition.

13. A deicing composition as defined in claim 12, wherein said one or more fluorinated surfactants comprise from about 0.001 to about 1.0 percent by weight of the composition.

14. A deicing composition as defined in claim 13, wherein said one or more fluorinated surfactants consists essentially of a mixture of mono- and bis-fluoroalkyl phosphates, ammonium salt, complexed with an aliphatic quaternary methosulfate.

15. A deicing composition as defined in claim 14, wherein said mixture comprises from about 0.003 to about 0.17 percent by weight of the composition.

16. A deicing composition which is compatible with the vinyl exterior coverings, butyl rubber seals, windshield wipers and painted surfaces and finishes adjacent an automobile windshield, the deicing composition consisting essentially of:
   one or more polyhydric alcohols;
   one or more monohydric alcohols from about 0.001 to about 5.0% by weight of;
   one or more fluorinated surfactants, and not more than 0.5% by weight of water.

17. A deicing composition as defined in claims 1 or 16, wherein the deicing composition consists substantially entirely of a mixture of one or more polyhydric alcohols, one or more monohydric alcohols, and one or more fluorinated surfactants.

* * * * *